(No Model.)  2 Sheets—Sheet 1.

J. M. BRASINGTON.
PEA THRESHER.

No. 596,978.  Patented Jan. 11, 1898.

Witnesses
Jas. K. McCathran
V. B. Hillyard

Inventor
John M. Brasington
By his Attorneys,
C. A. Snow & Co.

(No Model.) 2 Sheets—Sheet 2.
J. M. BRASINGTON.
PEA THRESHER.
No. 596,978. Patented Jan. 11, 1898.
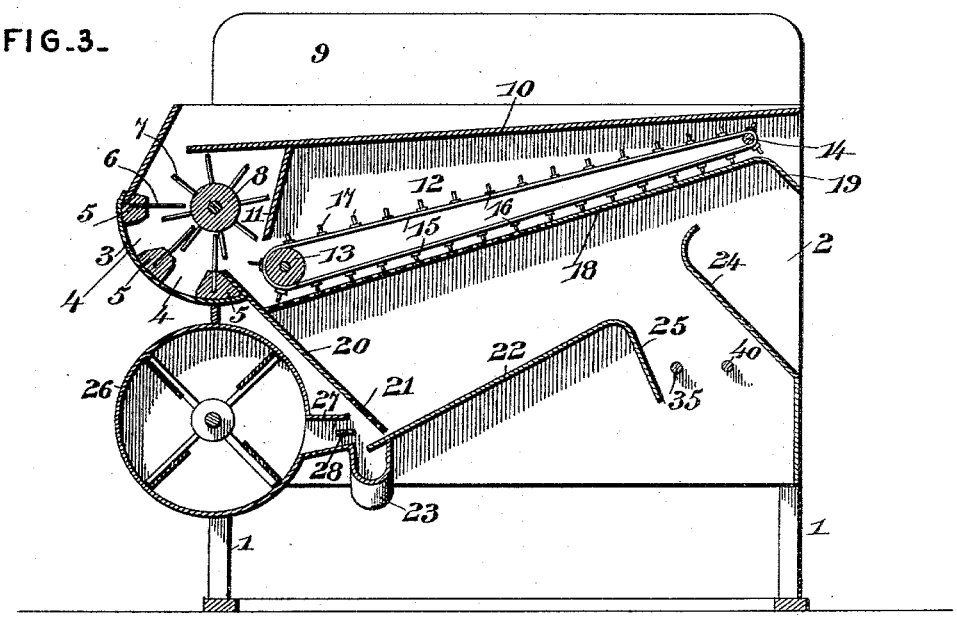
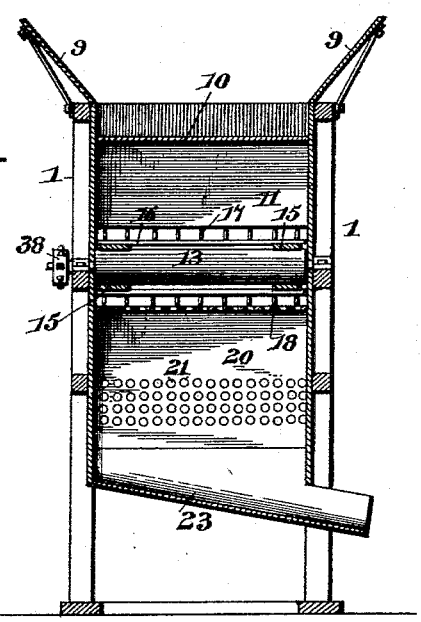
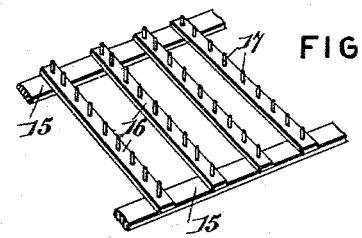
Witnesses
Jas. K. McCathran
V. B. Hillyard
Inventor
John M. Brasington
By his Attorneys,
C. A. Snow & Co.
THE NORRIS PETERS CO., PHOTO-LITHO., WASHINGTON, D. C.

UNITED STATES PATENT OFFICE.

JOHN M. BRASINGTON, OF MORVEN, NORTH CAROLINA, ASSIGNOR OF ONE-HALF TO CHARLES S. McCALL, OF BENNETTSVILLE, SOUTH CAROLINA.

PEA-THRESHER.

SPECIFICATION forming part of Letters Patent No. 596,978, dated January 11, 1898.

Application filed April 18, 1896. Serial No. 588,093. (No model.)

*To all whom it may concern:*

Be it known that I, JOHN M. BRASINGTON, a citizen of the United States, residing at Morven, in the county of Anson and State of North Carolina, have invented a new and useful Pea-Thresher, of which the following is a specification.

This invention relates to machines for threshing peas, beans, &c., and aims to break the hulls and pods and separate the peas from all small particles and deliver them in a marketable form, the hulls and broken pieces escaping or being blown to one side.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
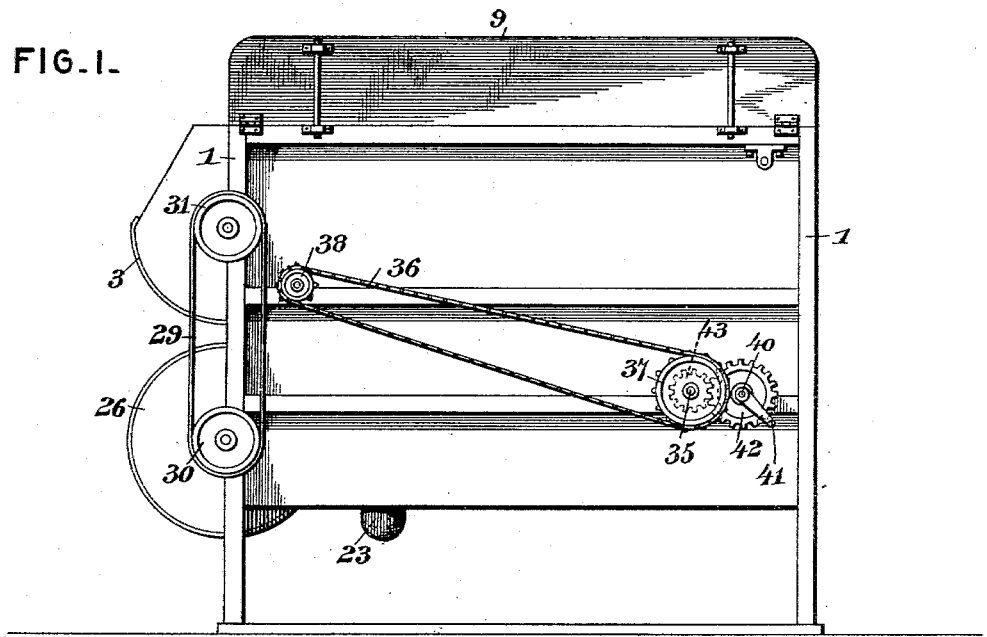
Figure 2:
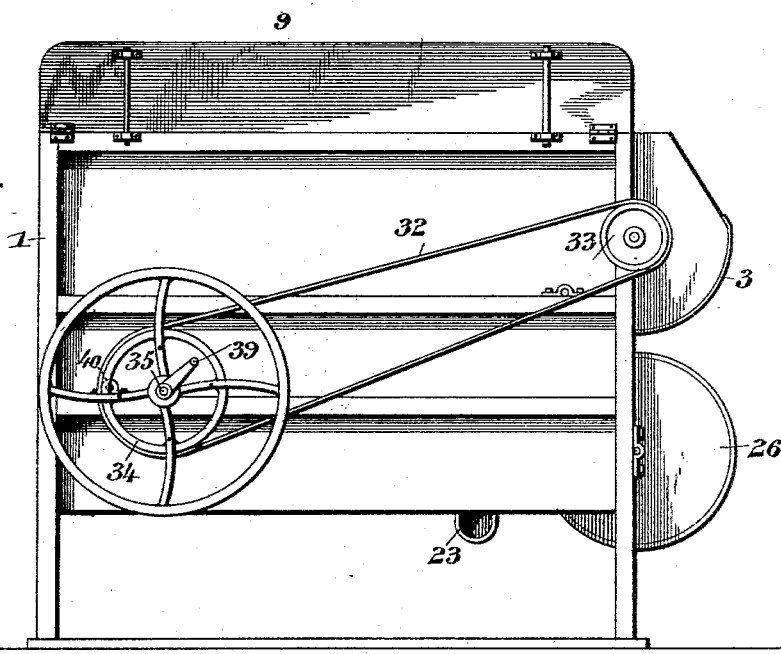

Figure 1 is a side elevation of a machine for attaining the objects of this invention. Fig. 2 is an elevation as seen from the remote side of Fig. 1. Fig. 3 is a vertical central longitudinal section thereof. Fig. 4 is a transverse section. Fig. 5 is a detail view of a portion of the endless conveyer. Fig. 6 is a detail view of a bar applied to the inner side of the concave.

Corresponding and like parts are referred to in the following description and indicated in the several views of the accompanying drawings by the same reference-characters.

The framework of the thresher is strengthened at the corners by posts 1, which are extended to form legs, and the upper portion is closed at its sides and front end, the rear end being open, as shown at 2, for the escape of the hulls and small particles of pods and other foreign matter separated from the peas during the threshing and cleaning process. The threshing mechanism and the fan-blower are located at the same end of the machine, which corresponds to the front, the blower being placed below the threshing mechanism.

The concave 3 has a series of transverse pockets 4 on its inner side, formed by bars 5, placed in parallel relation and spaced apart a distance corresponding to the width of the pockets. These bars 5 are preferably of wood and have teeth 6, which coöperate with corresponding teeth 7 of the threshing-cylinder 8. The upper portion or side of each bar is beveled or inclined to provide for the ready escape of the hulls during the threshing operation.

A hopper 9 is located over the entire structure, and its sides flare in opposite directions and are hinged so as to fold inward and close the top of the machine when the latter is not in use, thereby reducing the dimensions and at the same time affording a protection. The bottom 10 inclines from the rear forwardly and downwardly and terminates above and in advance of the threshing-cylinder 8, so as to deliver the peas, beans, &c., into the space formed between the concave and the threshing-cylinder. A deflector 11 is located in the rear of the threshing-cylinder and inclines forwardly and downwardly from the hopper-bottom, and its purpose is to prevent the threshing-cylinder from throwing the hulls and peas over the top portion of the endless conveyer 12, which latter is located below the hopper and inclines rearwardly and upwardly, being supported at its front end on a roller 13 and at its rear end by means of a roller 14. This endless conveyer is composed of a series of bands 15, of leather, canvas, metal, or other suitable material, and transverse slats 16, which are secured to the bands and have teeth 17, which latter engage with the broken hulls and move them to the rear of the machine, where they escape through the opening 2. A riddle 18 is placed below the endless conveyer and extends parallel therewith and in consequence inclines rearwardly and upwardly from its front end, the rear end thereof being curved, as shown at 19, to facilitate the discharge of the hulls and to deflect the blast of air in the manner presently to be described. This riddle is perforated for about half its length, the perforations being of a size for the passage therethrough of the peas, and this perforated portion is located to the front, so as to insure a separation of the peas from the hulls in the operation of the invention. A plate 20 is placed at the front end of the machine and inclines rapidly from the delivery end of the concave, and its lower portion is formed with a series of perforations, as shown at 21, for the passage therethrough of a blast of air to lighten and loosen the peas for the purpose of carrying off small particles of the hulls which may have passed through the riddle 18, and this plate inclines in an opposite direction to the riddle and has its lower edge a short distance from a return-board 22 below the riddle and inclining rearwardly and upwardly toward its rear end. A spout 23 extends transversely of the machine and is located at the lower front end of the return-board 22. A deflector 24 is placed at the rear end of the machine and inclines upwardly and forwardly and serves to prevent the blast of air carrying off any peas through the opening 2. It must be remembered that the blast of air from the blower is adjusted so as to carry off hulls and foreign matter and is not strong enough to support the peas, and in the event of the latter being blown over the return-board they will strike the deflector 24 and thus be saved. A wall 25 at the rear end of the return-board forms, with the deflector 24, a passage through which any peas blown over the rear end of the return-board escape and are prevented from mixing with the hulls.

The fan-blower 26 is placed immediately below the threshing mechanism and its nozzle 27 is supplied with a divider 28 for separating the blast into two parts, one part passing directly over the return-board 22 and the other part being directed through the perforations 21 at the lower end of the plate 20. The fan is operated from the threshing-cylinder by means of a drive-band 29, which passes around a pulley 30 on the fan-shaft and a pulley 31 on the shaft of the threshing-cylinder, and the latter is operated by means of a drive-belt 32, passing around a pulley 33 on the shaft thereof and around a pulley 34 on a transverse shaft 35, located near the rear end of the machine. A sprocket chain or belt 36 transmits motion from the shaft 35 to the roller 13 and passes around a sprocket-wheel 37 on the shaft 35 and a sprocket-wheel 38 on the shaft of the roller 13. This shaft 35 may be driven in any convenient way, either mechanically or by manual power, and is shown supplied with a crank 39 to be turned by hand. A shaft 40 extends parallel with the shaft 35 and has a crank 41 at the end opposite to the crank 39, and a gear-wheel 42, secured upon the shaft 40, meshes with a smaller gear-wheel 43 on the shaft 35, whereby power imparted to the shaft 40 is transmitted to the shaft 35 by means of the meshing gear-wheels 42 and 43.

The threshing-cylinder, fan-blower, and endless conveyer being operated in the manner described, the peas supplied to the hopper 9 are threshed and cleaned in the following way: The peas entering the space formed between the concave and threshing-cylinder have their pods or hulls broken by the operation of the teeth 6 and 7, and the first pocket of the series receives the broken hulls, thereby permitting the peas liberated from their pods to escape freely, and the hulls lodging in the first pocket are moved forward by the teeth of the threshing-cylinder immediately succeeding those first breaking the pods, and this operation is repeated by the succeeding teeth until the pods finally escape onto the lower end of the riddle 18. The broken pods and peas are moved through the threshing mechanism by the action of the teeth of the threshing-cylinder, supplemented by the suction created by the rapid rotation of the threshing-cylinder. The broken pods and peas being received upon the riddle 18 are moved over the latter by the endless conveyer and the peas and small particles of hulls drop through the perforations in the riddle and are received upon the plate 20 and the return-board 22, and before reaching these parts are subjected to a blast of air from the blower, which carries off the broken pieces over the deflector 24, beneath the curved end of the riddle and out through the opening 2, the curved terminal portion 19 of the riddle serving to give a downward course to the blast, thereby preventing scattering the broken pieces broadcast. The peas and broken pieces dropping upon the upper portion of the plate 20 are loosened and lightened by the blast passing through the perforations 21 when the said pieces and peas reach the lower end of the said plate 20.

Having thus described the invention, what is claimed as new is—

The herein-described pea-thresher, comprising a hopper extending over the framework and inclining toward one end, a threshing mechanism located beneath the delivery end of the hopper, a riddle placed beneath the hopper and inclining upwardly and rearwardly and having its front portion perforate and its rear portion imperforate and curved downwardly, a conveyer operating over the riddle, a deflector pendent from the hopper-bottom above the receiving end of the riddle, a fan below the threshing mechanism, a return-board opposite the fan, a spout at one end of the return-board, an inclined wall at the opposite end of the return-board, an inclined plate located in the space formed between the riddle and return-board and having its lower portion perforated, and a deflector located opposite the inclined plate and below the downwardly-curved end of the riddle, and forming a passage with the aforesaid inclined wall, substantially as shown for the purpose described.

In testimony that I claim the foregoing as my own I have hereto affixed my signature in the presence of two witnesses.

JOHN M. BRASINGTON.

Witnesses:
JOHN H. SIGGERS,
W. J. LAVARR.